United States Patent
Schaus et al.

(10) Patent No.: US 6,523,651 B2
(45) Date of Patent: Feb. 25, 2003

(54) BRAKE DISC WITH HAT SECTION HAVING RIBS THAT SUPPORT A FRICTION RING WITHOUT BONDING

(75) Inventors: Marion Schaus, Neukirchen (DE); Markus Wallentin, Goteborg (SE); Thomas Svensson, Cologne (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/946,120

(22) Filed: Sep. 4, 2001

(65) Prior Publication Data

US 2002/0104721 A1 Aug. 8, 2002

Related U.S. Application Data

(60) Provisional application No. 60/232,395, filed on Sep. 14, 2000.

(30) Foreign Application Priority Data

Feb. 1, 2001 (EP) .............................. 01102314

(51) Int. Cl.$^7$ .............................................. F16D 65/12
(52) U.S. Cl. .......................... 188/218 XL; 188/251 R
(58) Field of Search ....................... 188/218 XL, 218 R, 188/18 A, 251 R, 251 M

(56) References Cited

U.S. PATENT DOCUMENTS

| | | | | |
|---|---|---|---|---|
| 4,262,407 A | * | 4/1981 | Petersen et al. | 188/218 X |
| 4,263,992 A | * | 4/1981 | Moore et al. | 188/218 X |
| 5,109,906 A | | 5/1992 | Giancola | |
| 5,109,960 A | * | 5/1992 | Gunther | 188/218 X |
| 5,823,303 A | | 10/1998 | Schwarz et al. | |
| 5,927,447 A | * | 7/1999 | Dickerson | 188/218 R |
| 6,152,270 A | * | 11/2000 | Giorgetti | 188/218 X |

FOREIGN PATENT DOCUMENTS

| | | |
|---|---|---|
| DE | 2110482 | 3/1971 |
| DE | 2728335 A1 | 1/1978 |
| EP | 0077137 | 9/1982 |
| GB | 2231628 A | 11/1990 |

* cited by examiner

Primary Examiner—Matthew C. Graham
(74) Attorney, Agent, or Firm—Brinks Hofer Gilson & Lione

(57) ABSTRACT

A brake assembly comprising a hat section having an annular portion with an outer edge, and radial ribs integral with the hat section and extending away from the outer edge, and a friction ring of predetermined thickness and positioned around said hat section in coaxial position, the ribs having ends projecting into said friction ring so that the friction ring is mounted on said ribs and can expand freely in a radial direction.

1 Claim, 2 Drawing Sheets

BRAKE DISC WITH HAT SECTION HAVING RIBS THAT SUPPORT A FRICTION RING WITHOUT BONDING

This is based on U.S. Provisional Serial No. 60/232,395, filed Sep. 14, 2000.

TECHNICAL FIELD OF THE INVENTION

The present invention relates to disc brakes for vehicles. In particular, this invention is a structure which improves the high stress levels in the hat section and the friction ring as well as coning of the friction ring causing a reduced service life of the disc brake.

BACKGROUND OF THE INVENTION

Conventional brake disc designs have shown numerous disadvantages. The main function of the brake disc is to absorb the kinematic energy. The kinematic energy turns into heat that the brake disc must absorb. This thermal load on the brake disc is in most cases more severe than the mechanical loads. During a brake application with a conventional brake disc the friction ring expands radially and causes the hat section in the disc to expand with the friction ring. This introduces bending stress in the hat section. Material is added in the hat section to withstand the bending stress, thus stiffening the hat section. The stiff hat section increases the stress in the friction ring and causes it to tend to take on the shape of a cone. The coning decreases the service-of-life of the brake disc as well as the brake pad.

BRIEF SUMMARY OF THE INVENTION

The present invention relates to improvements in disc brakes in the areas just described. In this invention a front or rear brake disc consists of a hat section and a friction ring secured to the hat section. The hat section is cast together with the friction ring by a number of circumferential spaced radial ribs around the hat section. The ribs connect the hat section so that the ribs can move relative to the ring as a result of the mass of the friction ring.

A part of the rib that is cast into the friction ring has a constant cross-section. The ribs are cast into the friction ring without creating a melting zone between the hat section and the friction ring. Stated otherwise, the ribs do not bond to the friction ring. The ribs transfer the brake torque between the friction ring and the hat section. The constant cross-section of the rib allows the friction ring to expand freely in the radial direction but constrains axial and circumferential displacement between the friction ring and the hat section. The minimum length of the rib is the length that is sufficient to absorb the accumulated radial displacement between the friction ring and the hat section. The tip of the rib has a curved shape to minimize the stress introduced when a rotation occurs in the circumferential direction between the friction ring and the hat section.

Other general and more specific aspects of this invention will be set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

DETAILED DESCRIPTION OF THE PREFERRED EMBODIMENT

The following description of the preferred embodiment of the invention is not intended to limit the scope of the invention to this embodiment, but rather to enable any person skilled in the art to make and use the invention.

Figure 1:
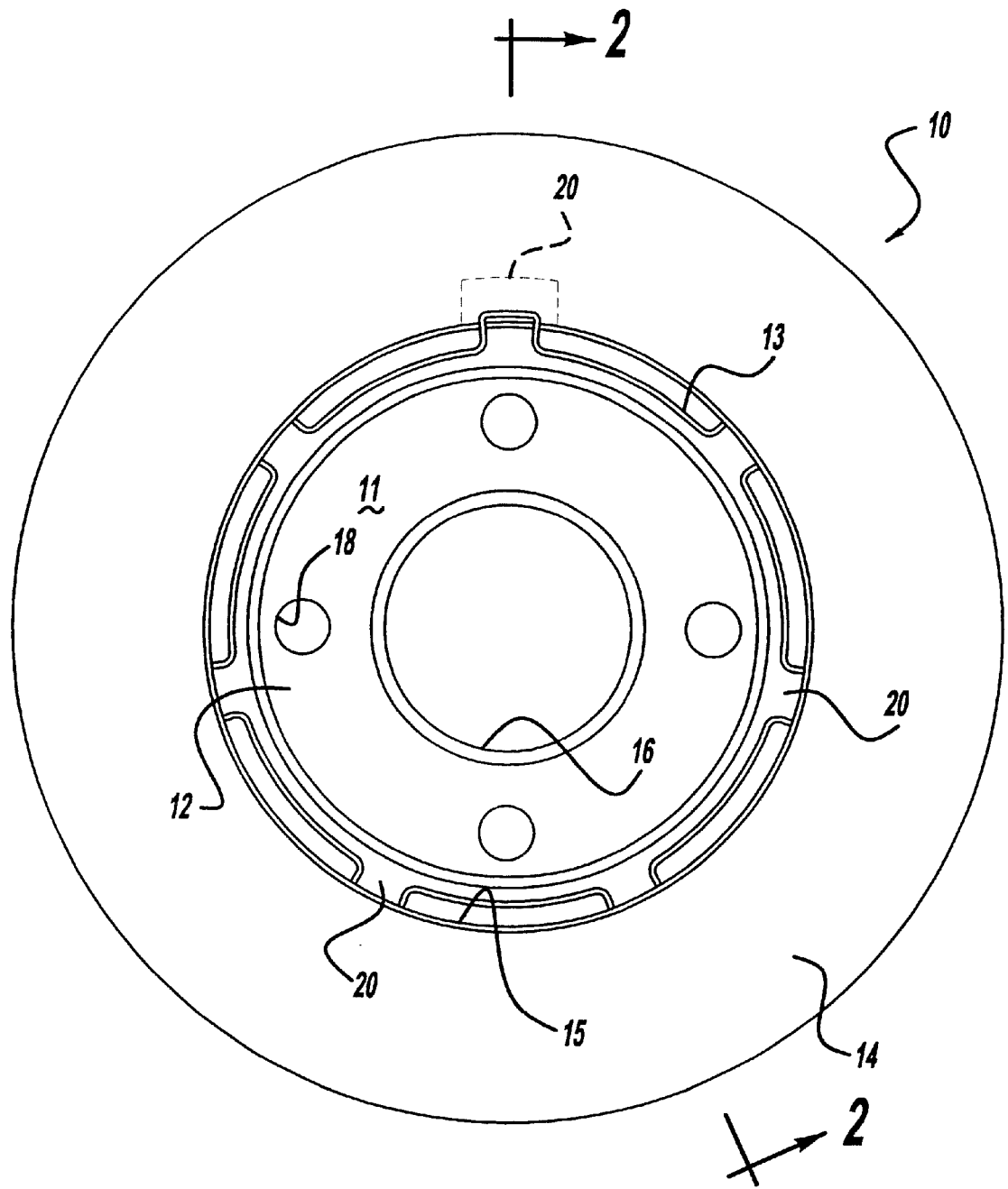
FIG. 1 is a front view of a brake disc embodying the principles of the invention.
Figure 2:
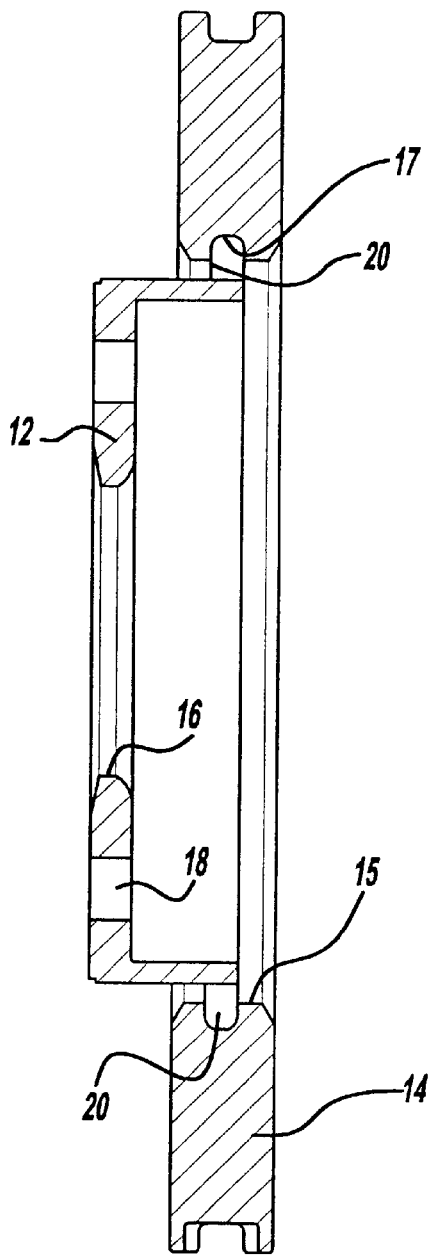
FIG. 2 is a sectional view of the brake disc as seen from the line 22 in FIG. 1.

A disc brake 10 embodying principles of the present invention is shown in FIG. 1 to comprise a hat section 12 and a friction ring 14. The hat section 12 has a hub 16 and bolt holes 18 for mounting the brake disc 10 on a vehicle (not shown). The hat section 12 has an annular portion 11, which has an outer edge 13. The friction ring 14 is in annular shape and is coaxial with the hat section. The inner edge 15 of the ring 14 is shown in FIG. 2. The hat section 12 is cast together with the friction ring 14 by a number of radial ribs 20 arranged around the hat section 12. The ribs 20 are in a pattern evenly spaced around the hat section and connect the hat section 12 and the friction ring 14.

Molten metal is cast into cavities 17 in the friction ring 14 to form ribs 20 without creating a melting zone between the hat section 12 and the friction ring 14. The two-piece embodiment enables the materials of the disc chamber and friction ring 14 to be optimally matched to the specified requirements, such as friction behavior, thermal properties, and strength. Thus, a two-part composite casting brake disc 10, in which peg-like fasteners engage complementary-designed chamber-like connecting recesses that are designed on the friction ring's inside perimeter. The peg-like ribs 20 also form an undercut in the connecting recesses, so that effective positive locking and a firm connection between the disc chamber and friction ring 17 results. In addition, it is possible to use different materials for the disc chamber and friction ring.

Figure 3:
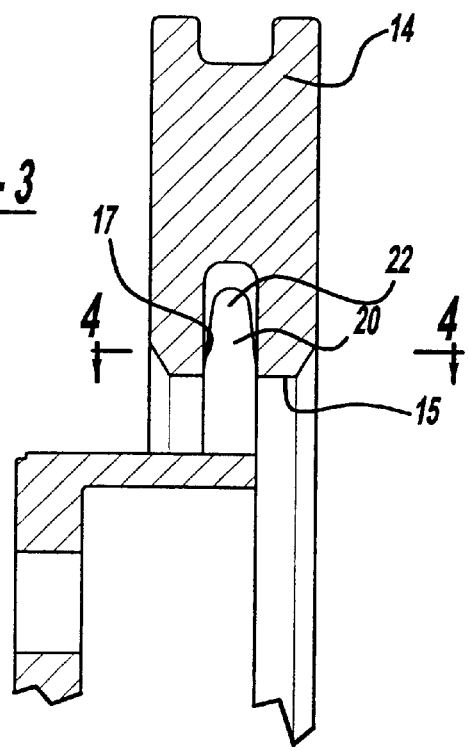
FIG. 3 is a fragmentary cross-section of the brake disc showing one of the ribs extending into the friction ring.
Figure 4:
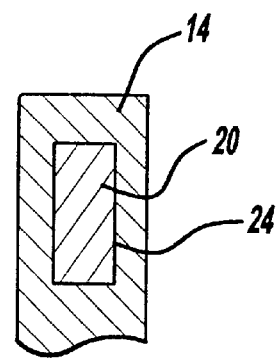
FIG. 4 is a fragmentary cross-sectional view of portions of the rib and the surrounding friction ring as seen from the line 4-4 in FIG. 3.

The arrangement of the hat section, radial ribs 20, and the friction ring 14 enables the manufacture of the disc brake 10 so that there is no melting zone between the hat section 12 and the friction ring 14. The ribs 20 transfer the brake torque between the friction ring 14 and the hat section 12. As shown in FIG. 4, the constant cross-section of the ribs 20 allows the friction ring 14 to expand freely in the radial direction that constrains axial and circumferential displacement between the friction ring 14 and the hat section 12. The length of the rib 20 where the cross-section is of a uniform cross-section should be as short as possible to avoid unnecessary constraints on the circumferential rotation between the friction ring 14 and the hat section 12. The minimum length is the length that is sufficient to absorb the accumulated radial displacement between friction ring 14 and hat section 12. The tip 22 of the rib 20 has a curved shape as shown in FIG. 3. In this example, the stress introduced is minimized when a rotation occurs in the circumferential direction between the friction ring 14 and the hat section 12.

When the brake disc 10 is in use it reduces the problems of withstanding the service loads that are still offering improved functionality. By disconnection the radial displacement of hat section 12 and friction ring 14, the stress in the hat section 12 and friction ring 14 and the coning of the friction ring is reduced. A minimal length of the part 24 of the rib with the constant cross-section, as shown in FIG. 4, and the curved tip 22 of the rib 20 keeps the stress in the rib low. The brake torque governs the number of ribs in their overall dimensions. It should be appreciated that the concept of the invention can be utilized with various numbers and shapes of ribs. Another positive feature of the invention is that the material of the hat section 12 and the friction ring 14 can be chosen the same or different. Materials of interest are for instance, ceramics, aluminum, steel, and globular and laminar gray cast iron.

The foregoing discussion discloses and describes the preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words of description rather than of limitation.

What is claimed is:

1. A brake disc for motor vehicles, said brake disc comprising: a hat section and a friction ring connected with said hat section, circumferential spaced cavities in said ring, circumferentially spaced ribs on said hat section corresponding in number to said cavities, said ribs extending radially outwardly and located in said cavities, the cross section of said ribs and the cross section of said cavities fit each other perpendicular to their radial length extending in the radial direction in such a manner that contact surfaces are present between said ribs and said cavities, moreover said ribs are provided with curved tips so the ribs are able to slide into said cavities in the direction of their radial length, each of said ribs being characterized by its radial length within its cavity is smaller than the largest dimension of the cross section of said rib, the part of the rib with the constant cross section constrains axial and circumferential displacement between the friction ring and the hat section and the constant cross section of said ribs allows said friction ring to expand freely in the radial direction that the ribs transfer the brake torque between said friction ring and said hat section and the curved tips of the ribs minimize the stress in the ribs.

* * * * *